United States Patent [19]
Arndt

[11] Patent Number: 6,027,556
[45] Date of Patent: Feb. 22, 2000

[54] NONSTAINING FINGERPRINT INK AND APPLICATOR THEREFOR

[75] Inventor: Douglas C. Arndt, Ventura, Calif.

[73] Assignee: Identicator, Inc., San Bruno, Calif.

[21] Appl. No.: 09/162,816

[22] Filed: Sep. 29, 1998

Related U.S. Application Data

[63] Continuation-in-part of application No. 08/902,854, Jul. 30, 1997, abandoned.

[51] Int. Cl.⁷ .................................................... C09D 11/00
[52] U.S. Cl. ...................................... 106/31.35; 106/31.58
[58] Field of Search ............................... 106/31.58, 31.35

[56] References Cited

U.S. PATENT DOCUMENTS

| | | |
|---|---|---|
| 4,029,012 | 6/1977 | Smith, III et al. . |
| 4,879,134 | 11/1989 | Vassiliades . |
| 4,983,415 | 1/1991 | Arndt et al. . |
| 5,395,444 | 3/1995 | Arndt et al. . |
| 5,620,508 | 4/1997 | Yamano et al. ....................... 106/31.29 |
| 5,669,965 | 9/1997 | Sawada et al. ....................... 106/31.29 |

*Primary Examiner*—Mark L. Bell
*Assistant Examiner*—Veronica F. Faison
*Attorney, Agent, or Firm*—Harold L. Jackson

[57] ABSTRACT

A nonstaining fingerprint ink is formulated from one or more alcohol soluble dyes, e.g., Acid Black 5 dye, dissolved in one or more fatty acid esters which have at least one available hydroxyl group, e.g., glycerol monoricinoleate, the dye constituting about 5% of the total ink by weight. An applicator, particularly well suited for the ink, includes a pad made of a melt blown calendared fabric encapsulated in a gas impermeable pouch.

13 Claims, 1 Drawing Sheet

NONSTAINING FINGERPRINT INK AND APPLICATOR THEREFOR

RELATED APPLICATION

This application is a continuation-in-part of application Ser. No. 08/902,854, filed Jul. 30, 1997 for Nonstaining Fingerprint Ink Pad Encapsulated Within a Disposable Pouch.

FIELD OF THE INVENTION

The present invention is directed to a substantially stainless fingerprinting ink and an applicator therefor.

DESCRIPTION OF THE PRIOR ART

Although there are other methods of identifying individuals, it has become readily apparent that fingerprints provide a unique and absolute means of identification that does not require cooperation from the subject. Fingerprint identification is an exacting science since two impressions of even the same fingerprint can appear different due to variations in inking, pressure, ink migration and changes in the finger itself with time. To determine and exact correspondence, a trained fingerprint technician, or more recently a computer, will compare the pattern of ridge endings and ridge bifurcations (minutiae) which are invariant with time on each person's fingerprint. It is to be noted that the term fingerprint as used herein encompasses prints of an individual's hands or feet, such as those taken from newly born infants and placed on birth certificates.

The prior art has recognized that the key to any viable fingerprint identification system requires a clear distinct print pattern with a minimum of ink migration between associate ridges. An additional requirement for any voluntary print identification system, such as to be utilized commercially with checks and the like, is that it be inoffensive to the person whose fingerprint is being obtained. A prime offense to persons has been the necessity to utilize an ink, such as finely ground carbon particles dispersed in a suitable medium, that would stain the hands of the individual being fingerprinted or the hands of the individual doing the fingerprinting, such as a nurse in applying the ink to the feet or hands of a baby.

Carbon based inks have been formulated with small amounts of carbon pigmentation to reduce the staining problem. See U.S. Pat. No. 5,395,444 and U.S. application Ser. No. 024,274, filed Feb. 17, 1998, assigned to the assignee of this application.

The prior art has also directed a considerable amount of effort in developing inkless fingerprinting systems which do not rely on carbon particles, but instead depend on a chemical reaction between a nonstaining reagent applied to the fingertips and a reactive reagent pre-applied to the paper or card receiving the print. Such systems are often referred to as inkless fingerprinting systems.

While the inkless fingerprinting systems have been largely successful in eliminating the staining or soiling problem, they generally require the above two step process, i.e., the application of one chemical reagent to the individual's fingertips (or palms, etc.) and the application of a developing reagent to the recording medium. See U.S. Pat. No. 4,029,012, assigned to Identicator, Inc. ("Identicator"), the assignee of this application.

As a result inkless fingerprinting systems are generally more expensive to manufacture and often more time consuming in obtaining the prints than conventional pigmented ink systems. Such problems have been largely obviated by an inkless system co-developed by the inventor herein which utilizes a thermosensitive recording paper for developing the latent fingerprint image. See U.S. Pat. No. 4,983,415 ("'415 patent) assigned to Identicator. This system has been marketed by Identicator for several years primarily for hospital use in which one reagent is contained in an encapsulated ink pad such as the one described in my co-pending application Ser. No. 902,854, filed Jul. 30, 1997, with the print being developed on thermal paper. The drawback of the '415 system is its reliance on commercial thermal paper which is generally thin, prone to curling and therefore somewhat objectionable for providing a permanent record of a baby's foot print, etc. In addition, such paper is not readily available in many countries. Also, many thermal papers are currently being produced with a protective top coating which acts as a barrier preventing the reagent applied to the fingertips or foot by the coating apparatus or pad from reaching and therefore from reacting with the reagent(s) contained in the thermal layer of the paper.

Inks formulated with leuco dyes have also been used in the fingerprinting field to obviate the staining problem. However, I have found inks comprised of the reaction products of leuco dyes fail to produce permanent images due to their instability to ultraviolet light and ph excursions.

Inks utilizing oil soluble dies can also be formulated which will not stain the skin. See U.S. Pat. No. 4,879,134. However, such inks tend to wick across the paper receiving the fingerprint, compromising the clarity of the print. Also, oil soluble dyes are not as light fast as alcohol solvent dyes compromising the permanance of the image.

There is a need for a nonstaining fingerprint ink which does not require a separate developing reagent and which can be used with conventional recording mediums such as ordinary paper, which provides a clear and permanent image and which is cost effective.

SUMMARY OF THE INVENTION

In accordance with the present invention, a substantially nonstaining fingerprint ink is formulated from one or more alcohol soluble dyes dissolved in one or more fatty acid esters which have at least one available hydroxyl group, e.g., glycerol monoricinoleate, with the dye accounting for 15% or less and preferably about 5% of the total ink by weight. The dyes can be of any desired color although black generally provides the best contrast between adjacent ridge endings and ridge bifurcations.

An encapsulated pad, particularly well suited for dispensing the nonstaining ink of the present invention, is described in my co-pending application Ser. No. 902,854. Such a pad is in the form of a disposable gas impermeable pouch with a pad made, for example, of a melt blown calendared fabric, impregnated with the ink, encapsulated within the pouch.

The nonstaining ink and a dispensing applicator therefore of the present invention may be best understood by reference to the following description taken in conjunction with the accompanying drawings of the application.

DESCRIPTION OF THE PREFERRED EMBODIMENT

Figure 1:
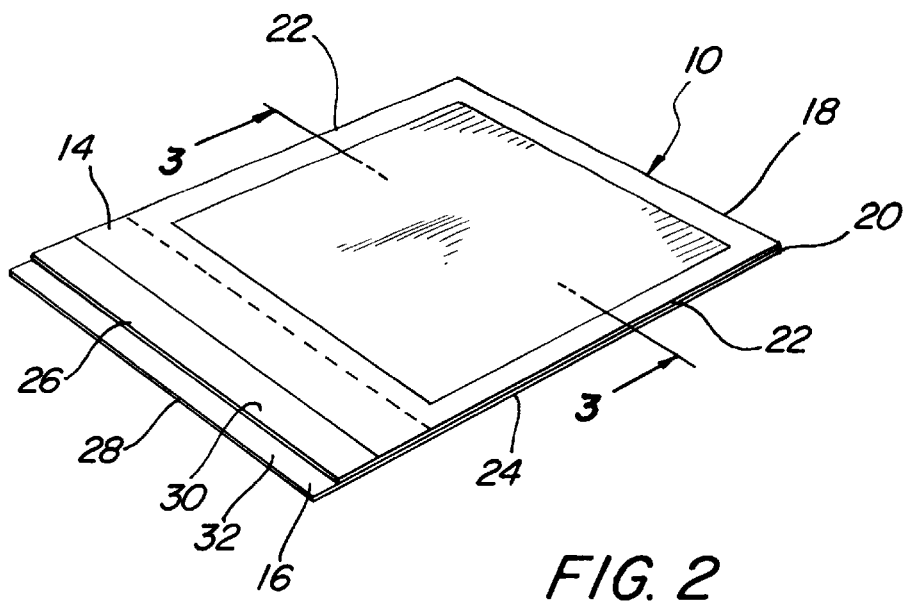
FIG. 1 is a perspective view of an applicator for the nonstaining ink of the present invention in the form of a pouch encapsulated disposable ink pad.

A substantially stain-free fingerprinting ink, in accordance with the present invention, is formulated by dissolving one or more alcohol soluble dyes in one or more fatty acid esters which have at least one available hydroxyl group the percentage of the dye(s) comprising about 2% to 15% by weight of the total ink and preferably about 3% to 7% (most preferably about 5%) by weight of the ink. Preferably the dye is of the metal complexed type, e.g., complexed with a polyvalent transition metal such as iron, chromium, copper or zinc. The metal complexing greatly improves the stability of the ink to sunlight. If one is not concerned with long term image permanency, metal complexing may not be required.

Examples of metal complexed alcohol soluble dyes suitable for use in the invention include the following distributed by Spectra Colors Corporation located in Kearny, New Jersey:

YELLOW 3R, YELLOW 42, FAST YELLOW TG EXT, YELLOW RE, YELLOW 157, YELLOW 2 GLN, YELLOW 073, YELLOW GG, ORANGE G, ORANGE RG-RLN, ORANGE 23, FAST ORANGE GRL, ORANGE RE, ORANGE G-245, FAST BROWN K, BROWN 2-GL, BROWN 2-RL, FAST RED S, RED 68, FAST SCARLET 69BP, FAST FIERY RED B, BORDEAUX B, RED 355, RED G, RED 5 BLG, FAST RED 3BA, RED BL-B, FIERY RED BL, FAST BLUE ARN, FAST BLUE 1605, FAST BLUE 3B SB43, BLUE 2GLN, BRILLIANT BLUE GN, BLUE FLE, GREEN 3G, DARK GREEN A50024, BLACK 13, BLACK RE, BLACK CN, BLACK RLN, BLACK RE/AX238, BLACK X-50, BLACK 46, BLACK 46CV, BLACK 46MV.

Examples of fatty acid esters having an available hydroxyl (OH) group include glyceryl monoricinoleate, glyceryl dilaurate, glyceryl monooleate, diethylene glycol monclaurate, diethylene glycol monooleate, propylene glycol monoricinoleate, PEG 200 monolaurate, PEG 200 dilaurate, PEG 300 monooleate, PEG 400 monolaurate, PEG 400 dilaurate, PEG 400 dioleate, PEG 400 monooleate, PEG 400 monotallate, PEG 400 ditallate, PEG 600 monolaurate, PEG 600 monooleate, PEG 600 dioleate, PEG 600 ditallate, PEG 600 monotallate, sorbitan monolaurate, sorbitan monooleate, sorbitan sesquioleate, sorbitan trioleate, hexaglyceryl dioleate, hexaglyceryl tetraoleate, decaglyceryl dioleate, decaglyceryl hexaoleate.

A suitable ink formulation as described in Ser. No. 902,854 may comprise: 1.5-pentanediol, Oleic Acid, Propylene Glycol, Castor Oil Ester with Diethanolamine, Acid Black 5 Dye and Solvent Red 109 Red Dye with the dyes accounting for about 5% by weight of the total ink.

I have found that aliphatic esters of a glycol or glycerol provide an excellent vehicle for dissolving one or more selected alcohol soluble dyes. The resulting ink is substantially stainless, water insoluble, stable and free from wicking. A preferable aliphatic ester is glyceryl monorricinoleate. An ink using this solvent is very stable with no discernable wicking.

An applicator for the above ink, particularly suited for a hospital environment, is described in co-pending application Ser. No. 902,854 and illustrated in FIGS. 1–3 herein. As illustrated in such figures, the application includes disposable nonstaining ink pad, generally indicated at 12, encapsulated within a sealed ink pouch 10. The ink pouch is formed by a first cover sheet 14 and a second cover or base sheet 16. The cover sheets are made from a suitable nonporous, gas-impermeable, pliable plastic or metallic material that can be hermetically sealed or bonded to each other by a suitable heat sealing means.

Accordingly, the respective cover sheets 14 and 16 are secured together along their corresponding peripheral edges defined by rear edge 18 of the first cover sheet 14 and rear edge 20 of the second cover sheet 16, and along side edges 22 of first cover sheet 14 and the respective side edges 24 of the second cover sheet 16.

The leading or front edge 26 of the first cover sheet 14 is offset from the lower positioned leading or front edge 28 so as to provide a pair of peel tabs 30 and 32, respectively, and define a pair of oppositely disposed lip members that are simply and easily pulled apart to open the sealed ink pouch 10, as illustrated in FIG. 1.

Figure 2:
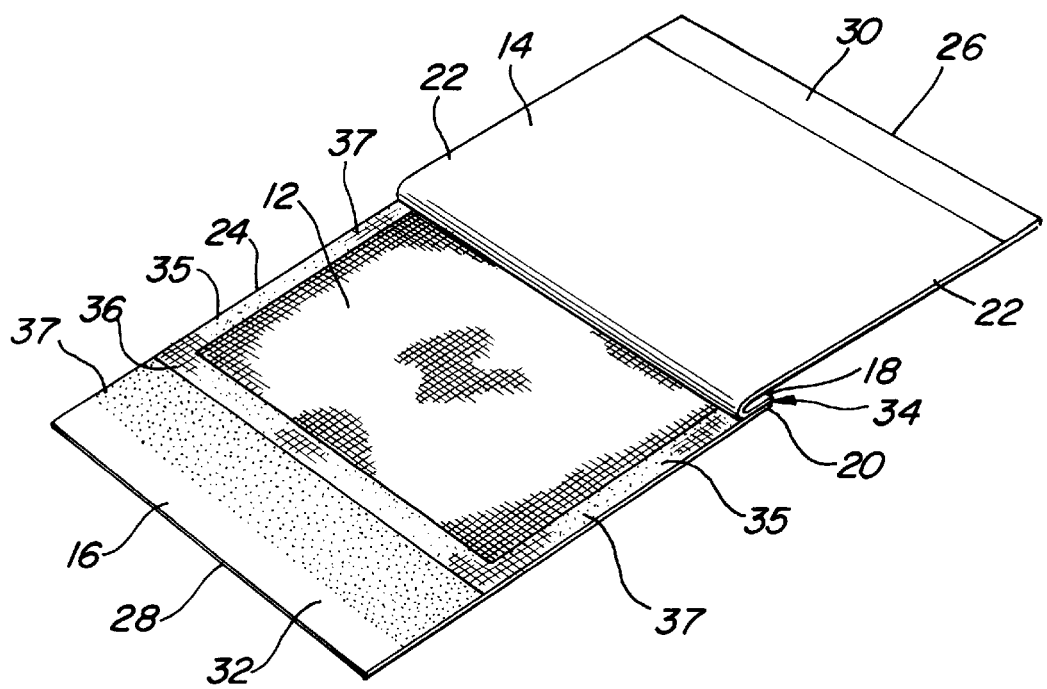
FIG. 2 is a pictorial view of the pouch showing the cover sheets pulled apart with the nonstaining ink pad attached to one of the cover sheets with the other cover sheet folded rearwardly so as to expose the pad for use.

Referring to FIG. 2, the pouch 10 is illustrated in an open usable mode, wherein the first cover sheet 14 has been pulled away by means of peel tabs 30 and 32 from the lower second cover (or base) sheet 16 and folded rearwardly over the rear edges 18 and 20, thus defining a hinge or spine, designated generally at 34. In this open mode the nonstaining ink pad 12 is fully exposed and ready for use.

Figure 3:
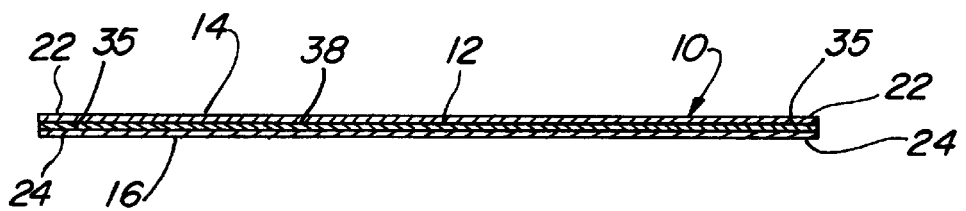
FIG. 3 is an enlarged cross-sectional view of the sealed pouch taken substantially along line 3—3 of FIG. 1.

Accordingly, the pad 12 is positioned between cover sheets 14 and 16 and thus secured along its opposite and rear edges 35 to both the first and second larger cover sheet 14 and 16, respectively. Since the pad 12 is shorter lengthwise than the two cover sheets 14 and 16, the pad 12 extends only from the hinged end or spine 34 to a point approximately two-thirds the length of cover sheets 14 and 16. The leading edge 36 of the pad 12 is enclosed between the adjacent front portions of cover sheets 14 and 16, thereby leaving free the peel tab members (or flaps) 30 and 32. Thus, in the assembled condition the sides 35 of the ink pad 12 are sealed to the cover sheets along the respective edges, which seal is preferably accomplished by a heat sealing process, as mentioned above, using a heat sealing coating which is indicated by stippling 37 along side edges 22 of first cover sheet 14 and the respective side edges 24 of the second cover sheet 16, and by rear edge 18 of the first cover sheet 14 and rear edge 20 of the second cover sheet 16. Once the heat sealing process is completed a sealed compartment 38 is defined, thereby encapsulating the pad, as seen in FIG. 3.

The heat sealing coating 37 ends short of where peel tab member 30 is superposed over peel tab member 32 so as to allow both tab members to be freely pulled apart when grasped, whereby both cover sheets are readily separated from each other, allowing the ink pad impregnated with the nonstaining ink to remain affixed to second cover (or base) sheet 16, as illustrated in FIG. 2. This allows the pad 12, when in an open mode, to be held in place by the hinge or spine end 34, so that the pad can be easily rubbed across the subject's skin, such as a baby's foot, without the pad disintegrating or peeling apart as is the case with other pads that are not secured within their respective pouch or chamber. Accordingly, the present invention can be readily used to wipe the palm of the hands or feet so as to provide the necessary and complete coverage of a given area of skin to establish a clearly defined print. The pad material is preferably made from a melt-blown, calendared, polyester fabric. A calendared polyester sheet having a weight within the range of about ½ to 3 ounces per square yard and preferably about 1 oz/yd$^2$ has been found very satisfactory. One or more layers of the sheet may be used to make up the pad. The nonstaining ink described above is inpregnated into the pad prior to forming the last heat seal, i.e., the seal adjacent the tabs 30 and 32. The ink of the present invention is particularly suitable for use with the above described applicator. When the pad is opened the ink is readily releasable in a uniform manner to provide adequate coverage of the ridges over the selected skin area that is to be printed. In contrast, pigmented ink, i.e., carbon particle based, has a tendency to become trapped in the pores of the fabric resulting in, among other things, nonuniform coverage of the area to be fingerprinted.

There has thus been described a novel fingerprinting ink (and applicator) which is not only very cost effective, which does not soil the fingers or other body areas receiving the ink and which can be used with conventional recording mediums such as ordinary paper. Additions to or modifications of the invention will become apparent to those skilled in the art without involving any departure from the spirit and scope of the present invention as defined in the appended claims.

What is claimed is:

1. A substantially stainless fingerprint ink comprising:
   one or more alcohol soluble dyes; and
   one or more fatty acid esters, each ester having at least one available hydroxyl group for holding the dye(s) in solution, the dyes being disolved in the fatty acid esters.

2. The invention of claim 1 wherein at least one dye is metal completed.

3. The invention of claim 2 wherein the metal is selected from the group consisting of iron, chromium, copper and zinc.

4. The invention of claim 1 wherein at least one fatty acid ester is glycerol monoricinoleate.

5. The invention of claim 1 wherein the percentage of the dye or dyes by weight of the total ink is within the range of 2% to 15%.

6. The invention of claim 5 wherein the percentage of the dye or dyes by weight of the total ink is within the range of about 3% to 7%.

7. The invention of claim 6 wherein the dye or dyes account for about 5% of the total ink by weight.

8. The invention of claim 5 wherein the fatty acid esters are selected from the group consisting of glyceryl monoricinoleate, glyceryl dilaurate, glyceryl monooleate, diethylene glycol monolaurate, diethylene glycol monooleate, propylene glycol monoricinoleate, PEG 200 monolaurate, PEG 200 dilaurate, PEG 300 monooleate, PEG 400 monolaurate, PEG 400 dilaurate, PEG 400 dioleate, PEG 400 monooleate, PEG 400 monotallate, PEG 400 ditallate, PEG 600 monolaurate, PEG 600 monooleate, PEG 600 dioleate, PEG 600 ditallate, PEG 600 monotallate, sorbitan monolaurate, sorbitan monooleate, sorbitan sesquioleate, sorbitan trioleate, hexaglyceryl dioleate, hexaglyceryl tetraoleate, decaglyceryl dioleate, and decaglyceryl hexaoleate.

9. The invention of claim 8 wherein the dyes are selected from the group consisting of ACID BLACK 5, YELLOW 3R, YELLOW 42, FAST YELLOW TG EXT, YELLOW RE, YELLOW 157, YELLOW 2 GLN, YELLOW 073, YELLOW GG, ORANGE G, ORANGE RG-RLN, ORANGE 23, FAST ORANGE GRL, ORANGE RE, ORANGE G-245, FAST BROWN K, BROWN 2-GL, BROWN 2-RL, FAST RED S, RED 68, FAST SCARLET 69BP, FAST FIERY RED B, BORDEAUX B, RED 355, RED G, RED 5 BLG, FAST RED 3BA, RED BL-B, FIERY RED BL, RED 109, FAST BLUE ARN, FAST BLUE 1605, FAST BLUE 3B SB43, BLUE 2GLN, BRILLIANT BLUE GN, BLUE FLE, GREEN 3G, DARK GREEN A50024, BLACK 13, BLACK RE, BLACK CN, BLACK RLN, BLACK RE/AX238, BLACK X-50, BLACK 46, BLACK 46CV, BLACK 46MV, and BLACK 105.

10. A substantially stainless fingerprint ink comprising:
    a solvent formulated from one or more alcohol soluble metal-complexed dies dissolved in one or more fatty acid esters, at least one ester having at least one available hydroxyl group, the dyes accounting for about 3% to 15% by weight of the total ink solution.

11. The invention of claim 10 wherein the fatty acid esters having the available hydroxyl group(s) is selected from the group consisting of glyceryl monoricinoleate, glyceryl dilaurate, glyceryl monooleate, diethylene glycol monolaurate, diethylene glycol monooleate, propylene glycol monoricinoleate, PEG 200 monolaurate, PEG 200 dilaurate, PEG 300 monooleate, PEG 400 monolaurate, PEG 400 dilaurate, PEG 400 dioleate, PEG 400 monooleate, PEG 400 monotallate, PEG 400 ditallate, PEG 600 monolaurate, PEG 600 monooleate, PEG 600 dioleate, PEG 600 ditallate, PEG 600 monotallate, sorbitan monolaurate, sorbitan monooleate, sorbitan sesquioleate, sorbitan trioleate, hexaglyceryl dioleate, hexaglyceryl tetraoleate, decaglyceryl dioleate, decaglyceryl hexaoleate.

12. The invention of claim 11 wherein the alcohol soluble dyes are selected from the group consisting of ACID BLACK 5, YELLOW 3R, YELLOW 42 , FAST YELLOW TG EXT, YELLOW RE, YELLOW 157, YELLOW 2 GLN, YELLOW 073, YELLOW GG, ORANGE G, ORANGE RG-RLN, ORANGE 23, FAST ORANGE GRL, ORANGE RE, ORANGE G-245, FAST BROWN K, BROWN 2-GL, BROWN 2-RL, FAST RED S, RED 68, FAST SCARLET 69BP, FAST FIERY RED B, BORDEAUX B, RED 355, RED G, RED 5 BLG, FAST RED 3BA, RED BL-B, FIERY RED BL, FAST BLUE ARN, FAST BLUE 1605, FAST BLUE 3B SB43, BLUE 2GLN, BRILLIANT BLUE GN, BLUE FLE, GREEN 3G, DARK GREEN A50024, BLACK 13, BLACK RE, BLACK CN, BLACK RLN, BLACK RE/AX238, BLACK X-50, BLACK 46, BLACK 46CV, BLACK 46MV.

13. The invention of claim 10 wherein each fatty acid ester has an available hydroxyl group.

* * * * *

UNITED STATES PATENT AND TRADEMARK OFFICE
CERTIFICATE OF CORRECTION

PATENT NO. : 6,027,556
DATED : 2/22/00
INVENTOR(S) : Douglas C. Arndt

It is certified that error appears in the above-indentified patent and that said Letters Patent is hereby corrected as shown below:

Column 3, line 39, "monclaurate" should read --monolaurate--.

Column 5, line 26, "completed" should read --complexed--.

Signed and Sealed this

Fifth Day of December, 2000

Attest:

Q. TODD DICKINSON

*Attesting Officer*　　　*Director of Patents and Trademarks*